(12) United States Patent
Niblock

(10) Patent No.: US 7,965,335 B2
(45) Date of Patent: Jun. 21, 2011

(54) WIRELESS CAMERA FLASH TRIGGER DEVICE

(75) Inventor: Kevin Niblock, Miami Beach, FL (US)

(73) Assignees: Robert M. Downey, Boca Raton, FL (US), part interest; Kevin Niblock, Pompano Beach, FL (US), part interest ( * ) Notice: Subject to any disclaimer, the term of this patent is extended or adjusted under 35 U.S.C. 154(b) by 354 days.

(21) Appl. No.: 12/291,220

(22) Filed: Nov. 7, 2008

(65) Prior Publication Data

US 2010/0118177 A1 May 13, 2010

(51) Int. Cl.
*H04N 5/222* (2006.01)
(52) U.S. Cl. ........ 348/371; 348/372; 348/373; 348/375; 348/376
(58) Field of Classification Search .............. 348/371, 348/372, 373, 375, 376
See application file for complete search history.

(56) References Cited

U.S. PATENT DOCUMENTS 4,752,792 A * 6/1988 Keith ............................ 396/425

* cited by examiner

*Primary Examiner* — Jason Chan
*Assistant Examiner* — Usman Khan
(74) *Attorney, Agent, or Firm* — Robert M. Downey, P.A.

(57) ABSTRACT

A flash accessory device readily adaptable to most compact digital camera models provides a hand grip with a mounting base for attachment to the bottom of a compact digital camera. The hand grip contains a multi-mode digital pre-flash detector circuit, a wireless transmitter and a battery power source. An articulating arm extends from the hand grip and is adjustably movable relative to the front of the camera in order to position a sensor on the end of the articulating arm directly in front of the camera's built-in flash. A cup member surrounding the sensor covers the built-in flash to block light emitted by the built-in flash. Light from the built-in flash is detected by the sensor which triggers transmission of a wireless signal from the transmitter to a receiver in a remote flash device to thereby activate illumination of the remote flash in synchronization with activation of the built-in camera flash.

7 Claims, 5 Drawing Sheets

WIRELESS CAMERA FLASH TRIGGER DEVICE

BACKGROUND OF THE INVENTION

1. Field of the Invention

The present invention relates to camera flash accessory devices and, more particularly, to an apparatus for triggering operation of a remote flash in synchronization with activation of a built-in flash of a compact digital camera while blocking the light emitted by the built-in camera flash.

2. Discussion of the Related Art

Flash devices have long been used in the field of photography for casting light onto the subject of a photograph at the moment the camera shutter opens to take the photograph. In most instances, the camera flash is located on or directly adjacent to the camera. For many years, cameras have been made to include a hot shoe for removably attaching an electronic flash accessory device that is triggered in synchronization with the shutter operation of the camera. Other camera models have a built-in electronic flash, including compact digital cameras that have been increasing in popularity in recent years. In fact, the excellent picture quality achieved with some high resolution compact digital camera models appeals to not only amateur photographers, but professionals as well.

Notwithstanding the high resolution capability of compact digital cameras, there are times when the light provided by the built-in electronic flash of the camera is less than adequate for taking a professional quality photograph. This can be a result of poor ambient lighting conditions, undesirable shadows and reflections, or the subject being beyond the illuminating capability of the camera flash.

It has been observed that use of a remote flash can provide greater illumination to eliminate shadows, glare and reflection, while providing the desired lighting effect on the subject. When properly used with a high resolution digital camera, a remote flash can be instrumental in achieving a professional studio quality photograph. In fact, photographs of the same subject, taken first with a built-in camera flash of a compact digital camera and then separately with use of a remote flash, will reveal a dramatic difference in photograph quality. However, presently available compact digital camera models do not provide for disablement of the built-in flash and wireless connection of a remote flash device.

Accordingly, until the present invention, it has not been possible to easily adapt a wireless remote flash device to a compact digital camera and trigger activation of the remote flash while blocking the built-in flash, wherein the subject of a photograph is illuminated by the remote flash and not the built-in camera flash when taking a photograph.

Various camera flash devices have been developed over the years for triggering a remote flash in synchronization with the shutter operation of the camera. For example, U.S. Pat. No. 5,678,075 to Doukas discloses a camera accessory device that mounts to a camera and triggers an external strobe upon excitation of a built-in electronic flash, while simultaneously blocking the light emitted by the built-in flash. The external strobe connects to the device via a cable. This device is specifically designed for attachment to a particular camera type and model having a unique shape and a specific built-in flash location. Thus, this device is not universally adaptable to other camera models and it is not wireless.

U.S. Pat. No. 5,384,611 to Tsuji et al. discloses a camera system capable of wireless flash photography, comprising a camera and an external flash unit, wherein the external flash unit transmits a discriminating data, such as a synchronized shutter speed, and the camera receives the discriminating data. According to the received data, a photo taking operation of the camera is executed.

U.S. Pat. No. 5,721,971 to Sasaki discloses a wireless slave electronic photoflash device located separately from a camera body. The slave device is responsive to light emission of a master electronic flash unit built in or connected to the camera body for emitting light synchronized with the master flash unit.

U.S. Pat. No. 5,023,639 to Ushiro et al. discloses a slave electronic flash unit which is removably mounted on a camera having a built-in electronic flash. An auxiliary flash is generated when a photo sensor detects the light from the built-in flash. In operation, both the built-in flash and the external flash are simultaneously activated to emit light onto to the subject being photographed.

While the various flash accessory devices in the related art are useful for their intended purposes, there remains a need for a versatile flash accessory device that can be used on a wide variety of compact digital camera models from various manufacturers and which provides for a hand grip with an adjustably positionable sensor and transmitter, and a remote receiver connected with a remote flash, wherein the device triggers wireless activation of the remote flash upon activation of the built-in camera flash while blocking light emitted by the built-in flash.

SUMMARY OF THE INVENTION

The present invention is directed to a flash accessory device that is readily adaptable to most compact digital camera models. The flash accessory device includes a hand grip with a handle portion and a mounting base. The mounting base is specifically structured and disposed for attachment to the bottom of a compact digital camera using a threaded fastener for receipt within the standard ¼ inch tripod socket on the bottom of most compact digital camera models. The handle portion of the hand grip contains a multi-mode digital pre-flash detector circuit, a wireless transmitter and a battery power source. An articulating arm assembly extends from the handle portion of the hand grip and is adjustably movable relative to the front of the camera in order to position a flash sensor on the end of the articulating arm assembly directly in front of the camera's built-in flash. A cup member surrounding the flash sensor is positionable to cover the built-in camera flash to block light emitted by the built-in flash. The light from the built-in flash is detected by the flash sensor which triggers transmission of a wireless signal from the transmitter to a receiver in a remote flash device, thereby activating illumination of the remote flash in synchronization with activation of the built-in camera flash. In one embodiment, the remote flash device includes a receiver with a hot shoe for attachment of a conventional flash device. In another embodiment, the receiver and flash device are incorporated within a one piece unit.

The sensor/detector circuitry within the handle portion of the grip is programmable to accommodate different compact digital camera models having a variety of pre-flash sequences that flash before the main flash. The sensor/detector circuitry detects the pre-flashes and triggers transmission of the wireless signal from the transmitter to the remote receiver when the main flash is detected.

OBJECTS AND ADVANTAGES OF THE INVENTION

Considering the foregoing, it is a primary object of the present invention to provide a flash accessory device that is readily adaptable to most compact digital camera models, and wherein the flash accessory device is structured and disposed for triggering wireless activation of a remote flash device.

It is a further object of the present invention to provide a flash accessory device for compact digital cameras, and wherein the flash accessory device includes a hand grip with a handle and an integral base for universal attachment to the standard tripod socket on the bottom of most compact digital camera models.

It is still a further object of the present invention to provide a flash accessory device that includes a grip and an integral base for mounting most compact digital camera models on the accessory device, and further including an articulating arm assembly for adjustably positioning a sensor directly in front of a built-in flash of the compact digital camera (regardless of the flash location on the camera) for sensing actuation of the built-in flash and triggering synchronized actuation of a remote flash by wireless signal.

It is still a further object of the present invention to provide a flash accessory device that is readily adaptable for use with most compact digital camera models, and wherein the flash accessory device is structured to trigger activation of a remote flash in synchronization with activation of a built-in flash of the compact digital camera while blocking the light emitted by the built-in camera flash.

It is still a further object of the present invention to provide a flash accessory device that is readily adaptable for use with most compact digital camera models, and wherein the accessory device allows for wireless activation of a remote flash to provide studio quality photographs.

These and other objects and advantages of the present invention are more readily apparent with reference to the following detailed description and the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
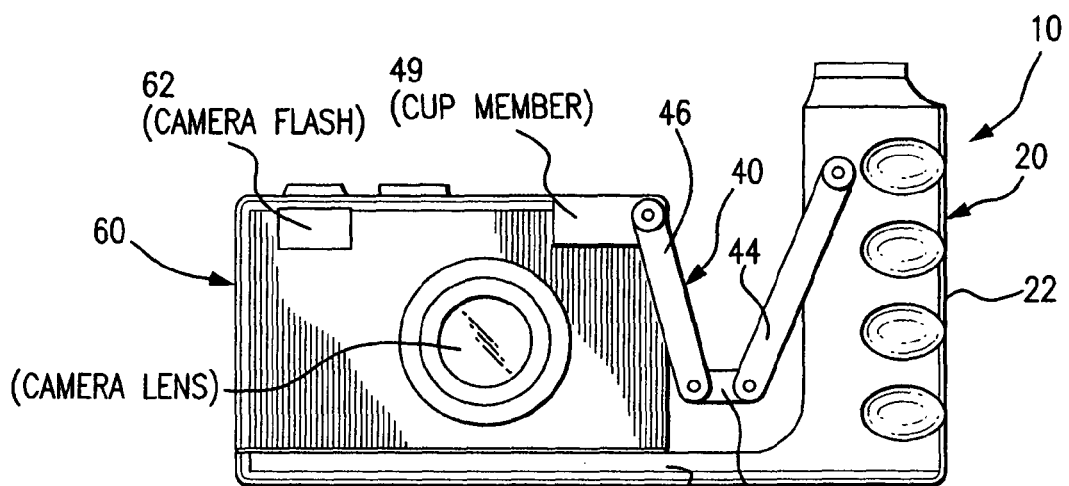
FIG. 1 is a front elevational view showing a compact digital camera mounted to the hand grip of the flash accessory device of the present invention, with an articulating arm assembly in a first adjusted position.
Figure 2:
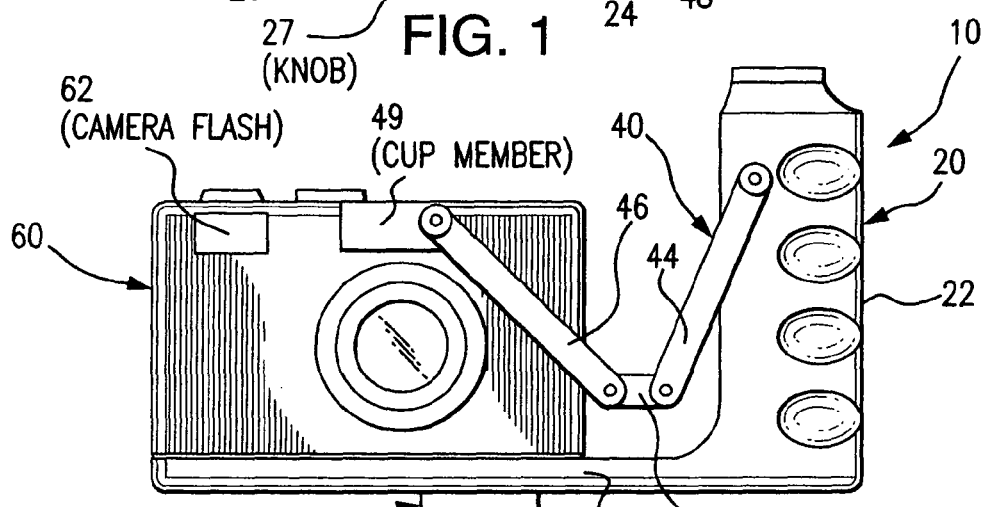
FIG. 2 is a front elevational view showing a compact digital camera mounted to the hand grip of the flash accessory device of the present invention, with the articulating arm assembly in a second adjusted position.
Figure 3:
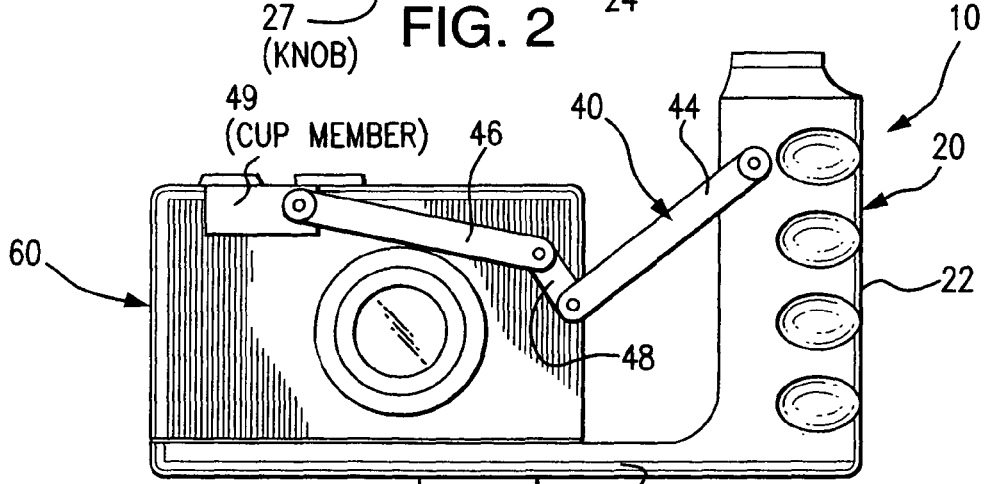
FIG. 3 is a front elevational view showing a compact digital camera mounted to the hand grip of the flash accessory device of the present invention, with the articulating arm assembly in a third adjusted position.
Figure 4:
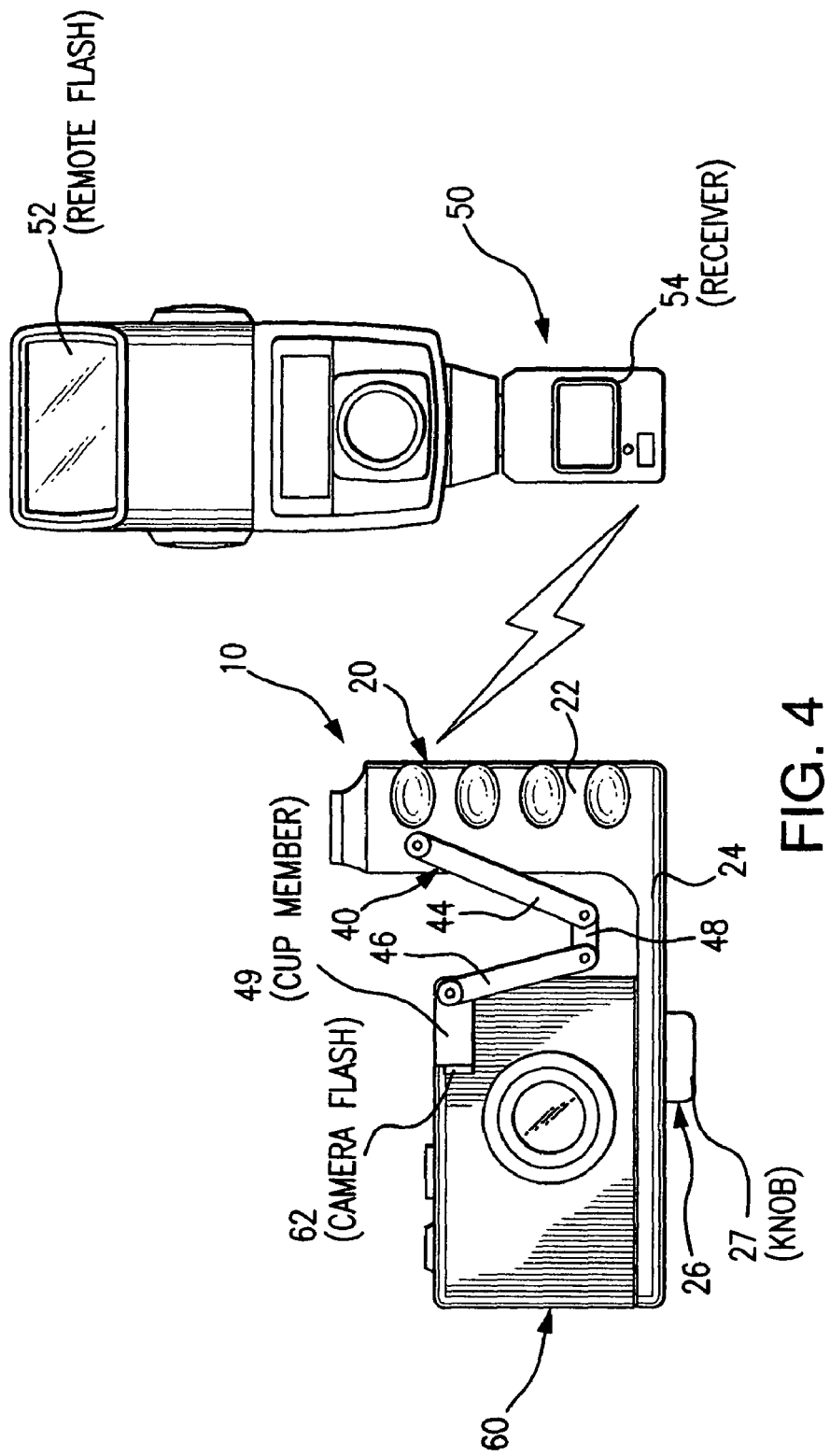
FIG. 4 is a front elevational view schematically showing wireless transmission of a signal between the hand grip unit of the flash accessory device and a remote receiver attached to a remote flash for synchronized activation of the remote flash when the built-in flash of the compact digital camera is activated.
Figure 5:
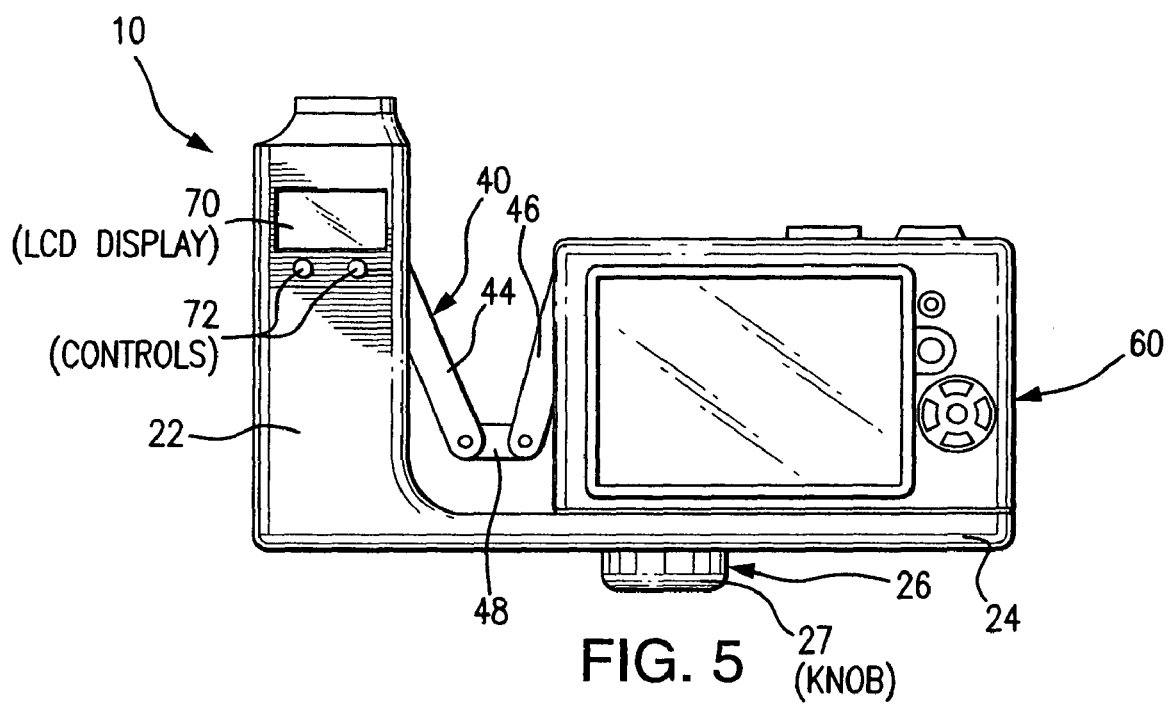
FIG. 5 is a rear elevational view showing the hand grip and a compact digital camera mounted thereon, and further illustrating an LCD display, flash mode operation controls and a hot shoe on the hand grip for optional attachment of a shoe-mount flash.
Figure 6:
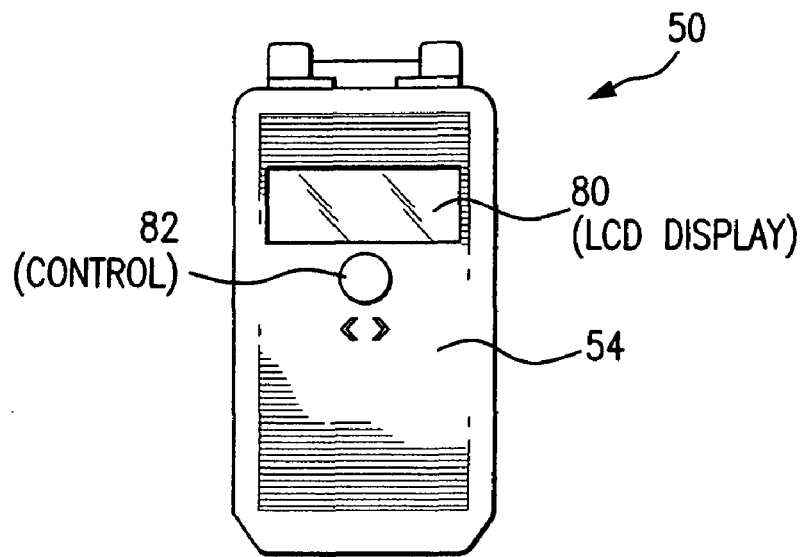
FIG. 6 is a rear elevational view showing a first embodiment of the remote flash receiver including a hot shoe for attachment of a remote flash and an LCD display and control button.
Figure 7:
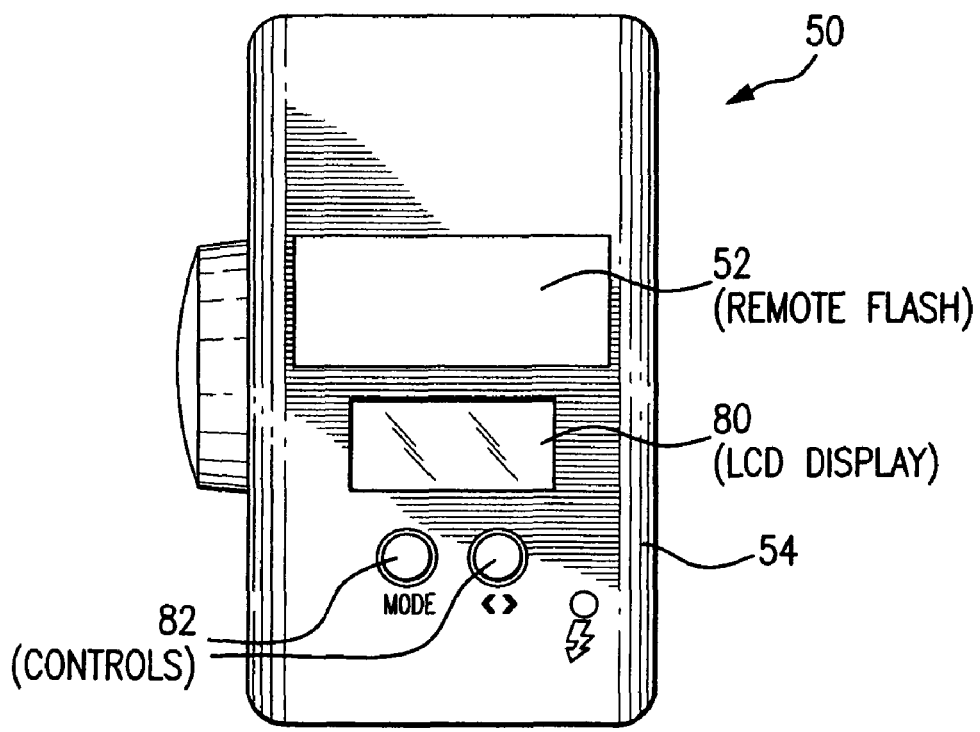
FIG. 7 is a rear elevational view showing a second embodiment of the remote flash receiver including an integrated flash unit and LCD display with mode control buttons.
Figure 8:
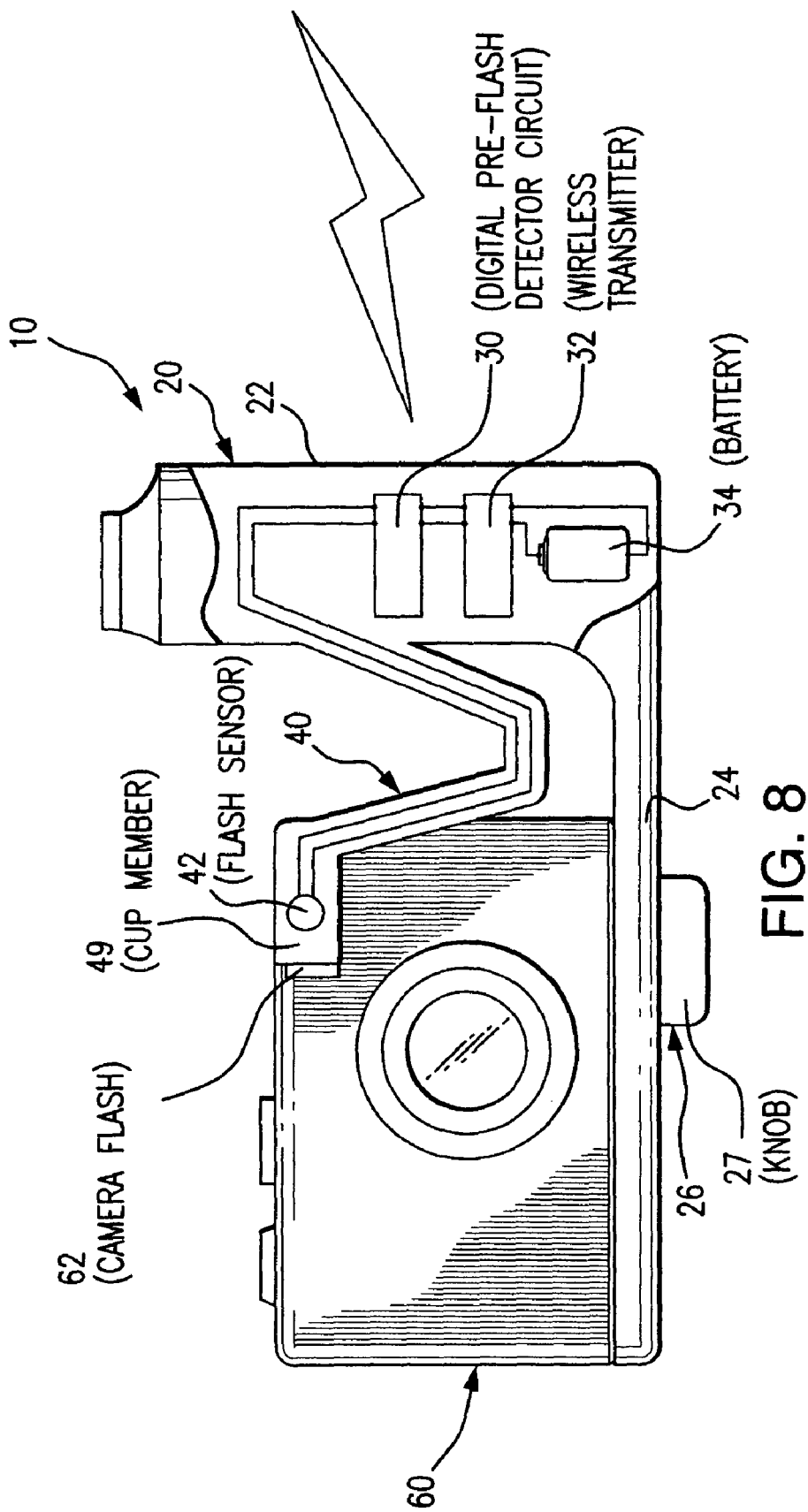
FIG. 8 is a front elevational view of the hand grip with a compact digital camera mounted thereto, and showing a general wiring diagram of the components in the hand grip, including a flash sensor, a multi-mode digital pre-flash detector circuit, a wireless transmitter and a power source.

The flash accessory device is shown throughout the several views of the drawings and is generally indicated as 10. The flash accessory device 10 is adapted for use with most compact digital camera models and is structured for wireless activation of a remote flash 52 in synchronization with activation of a built-in flash 62 of the compact digital camera 60 while blocking the light emitted by the built-in camera flash 62. The flash accessory device 10 includes a hand grip 20 with a handle portion 22 and a mounting base 24. The mounting base 24 attaches to the bottom a compact digital camera 60 using the standard ¼ inch tripod socket on the bottom of the camera and a threaded fastener 26 comprised of a screw thread shaft and a turning knob 27 on the end of the shaft. The handle portion 22 of the hand grip 20 contains a multi-mode digital pre-flash detector circuit 30, a wireless transmitter 32 and a battery power source 34.

An articulating arm assembly 40 extends from the hand grip 20 for positioning a sensor 42 directly in front of the camera's built-in flash 62. The articulating arm assembly 40 includes a first arm 44 pivotally connected to the grip, and a second arm 46 movably connected to the first arm by a link 48 that is pivotally joined between both arms. A cup member 49 is movably fitted to the distal end of the second arm 46 and covers the sensor 42. The articulating arm assembly 40 is adjustably movable relative to the front of the camera in order to position the flash sensor 42 on the distal end of the second arm member 46 directly in front of the camera's built-in flash 62. The cup member 49 blocks light emitted by the built-in camera flash 62.

When the built-in flash 62 of the compact digital camera 60 is actuated, light emitted by the built-in flash is detected by the flash sensor 42 on the articulating arm assembly 40. Upon sensing the flash, the pre-flash detector circuit 30 triggers transmission of a wireless signal from the transmitter to a receiver 54 at a remote flash device 50. Upon receipt of the wireless signal, the remote flash device 50 actuates a remote flash 52 in synchronization with activation of the built-in camera flash 62. The remote flash device 50 may include a "hot shoe" or "shoe-mount" 56 for attachment of the remote flash 52. Alternatively, the remote flash 52 may be incorporated within the remote flash device 50 as an integrated unit. Both the hand grip 20 and the remote flash device 50 are provided with LCD displays 70,80 and controls 72,82 for setting various flash operational modes, a pre-flash timing sequence, flash power output, channel frequency, and other functions. The hand grip 20 may also include a hot shoe for attaching a shoe mount flash on the top of the handle portion 22. In this instance, both the remote flash 52 and the shoe mount flash on the hand grip 20 can be simultaneously activated when additional flash light on the subject is desired.

While present invention has been shown and described in accordance with various preferred embodiments, it is recognized that departures from the instant disclosure are contemplated within the spirit and scope of the present invention as defined in the following claims and interpreted under the doctrine of equivalents.

What is claimed is:

1. A flash accessory device for a digital camera comprising:
    a hand grip including a handle portion and a base, said base being structured and disposed for removable attachment to a bottom of the digital camera;
    a transmitter within the hand grip for transmitting a wireless flash activation signal;
    a battery power source within the hand grip for energizing the flash accessory device;
    an articulating arm assembly including a first end attached to the hand grip and an opposite distal end, said articulating arm assembly being structured and disposed for adjustably positioning the distal end relative to the digital camera when the base of the hand grip is attached to the bottom of the digital camera;
    a flash sensor on the distal end of the articulating arm assembly for detecting light emitted by a flash of the digital camera;
    a multi-mode digital detector circuit within the hand grip and communicating with the flash sensor and the transmitter, said multi-mode digital detector circuit being structured and disposed for triggering the transmitter to transmit the wireless flash activation signal upon the flash sensor detecting the light emitted by the flash of the digital camera; and
    a remote flash device including a receiver and a remote flash, and said receiver being structured and disposed for receiving the wireless flash activation signal transmitted by the transmitter in the hand grip for triggering flash illumination of the remote flash.

2. The flash accessory device as recited in claim 1 wherein said articulating arm assembly includes a plurality of arm members pivotally joined to allow adjustable movement and positioning of the distal end and the flash sensor.

3. The flash accessory device as recited in claim 1 further comprising:
    a cup member fitted to the distal end of the articulating arm assembly and at least partially surrounding the flash sensor, the cup member being structured and disposed for blocking the light emitted by the flash of the digital camera without interfering with the detection of the light by the flash sensor.

4. The flash accessory device as recited in claim 1 wherein the handle portion of the hand grip includes a shoe mount for attaching a camera flash, and the shoe mount communicating with the multi-mode digital detector circuit, wherein the flash illumination of the remote flash and the camera flash attached to the shoe mount are simultaneously activated upon the flash sensor detecting light emitted by the flash of the digital camera.

5. The flash accessory device as recited in claim 1 wherein said hand grip further comprises:
    an LCD display; and
    a plurality of control buttons for setting and controlling functions of the flash accessory device including a plurality of flash operational modes.

6. The flash accessory device as recited in claim 1 wherein the remote flash device further comprises:
    an LCD display; and
    a plurality of control buttons for setting and controlling functions of the flash accessory device.

7. The flash accessory device as recited in claim 1 wherein said remote flash device further comprises:
    a shoe mount for attaching the remote flash to said remote flash device.

\* \* \* \* \*